United States Patent Office 3,554,905
Patented Jan. 12, 1971

3,554,905
PROCESS FOR TREATING WATER WITH A POLY-HALIDE RESIN USING A SEMIPERMEABLE MEMBRANE BARRIER
John Place, Ulrich Weissenberg, and Robert D. Goodenough, Midland, Mich., assignors to The Dow Chemical Company, Midland, Mich., a corporation of Delaware
No Drawing. Filed Apr. 1, 1969, Ser. No. 812,319
Int. Cl. B01d 13/00
U.S. Cl. 210—22                         8 Claims

ABSTRACT OF THE DISCLOSURE

An improved process for treating water with halogen released by an anion-exchange resin in polyhalide form is obtained by using a membrane permeable to halogen but essentially impermeable to water and water-soluble anions to separate the polyhalide resin and the water being treated. Such a membrane reduces the polyhalide resin instability arising from the influence of water-soluble anions and alkalinity in the water supply. Particularly effective in this process is a polyethylene film packet of a polybromide resin.

BACKGROUND

Halogens have long been used to control microorganisms in water. In U.S. Pat. 3,316,173 Mills, Goodenough and Nekervis describe the use of an anion-exchange resin in polybromide form for the treatment of aqueous liquids with bromine. Sloan U.S. Pat. 3,425,790 describes a multi-bed resin process for obtaining equilibrium controlled amounts of halogen or interhalogen in a fluid medium. Also Goodenough, Place and Gunkler, U.S. application Ser. No. 648,052 filed June 22, 1967 now U.S. Pat. 3,-436,345 describes a water-porous polybromide resin packet useful for treating smaller amounts of water.

In each case the polyhalide resin functions essentially as a halogen carrier releasing a portion of its halogen to the aqueous liquid in contact with the resin. The release or elution of halogen from a column of polyhalide resin is a function of the liquid flow rate and relative halogen concentrations. However, in some areas, unexpected column instabilities and erratic elution rates have been observed with tap water. A major factor causing such instability has now been identified as the presence of excess alkalinity and water-soluble anions such as chloride, carbonate and sulfate in the water.

STATEMENT OF THE INVENTION

More stable elution rates for the release of halogen or interhalogen from a polyhalide resin are obtained by separating the polyhalide resin and aqueous liquid with a semipermeable membrane through which the halogen can diffuse but which is essentially impermeable to water. Thus the improved process comprises: contacting the aqueous liquid with a semipermeable membrane interposed between (1) the liquid and (2) a water-wet polyhalide resin having a higher equilibrium concentration of halogen or interhalogen than the liquid to be treated, said membrane being permeable to the halogen or interhalogen but essentially impermeable to water-soluble anions in the aqueous liquid, and thereby transferring halogen or interhalogen from the polyhalide resin (2) to the aqueous liquid (1). For example, a thin polyethylene bag containing wet polybromide resin can be suspended in a water stream passing through a cooling tower or placed in a conventional resin column through which at least a portion of the aqueous liquid is passed.

GENERAL DESCRIPTION

Polyhalide resin

Polyhalide resins formed by absorption of a halogen or interhalogen from aqueous solution with an anion-exchange resin are described in Mills et al. U.S. Pat. 3,316,173, Sloan U.S. Pat. 3,425,790 and other art cited therein. The anion-exchange resin carrier is preferably a commercial strong base quaternary ammonium anion-exchange resin. The halogen is held by the resin as a complex polyhalide anion $(X_{2n}Y^-)$ where X and Y are halogen and $n$ is 1, 2 or 3. But since the dissociation of polychloride and fluorine containing polyhalide resins is too high for practical use at room temperature, polyhalide resins containing absorbed bromine, bromine chloride, iodine, iodine chloride, and iodine bromide are preferred.

Since the equilibrium concentration of halogen in water in contact with the polyhalide resin and also the rate of diffusion of the halogen through the semipermeable membrane are dependent on the halogen content of the polyhalide resin, a high halogen or interhalogen content is desirable. Preferably the resin should contain at least 5 wt. percent and preferably about 10–50 wt. percent active halogen based on the weight of wet loaded resin. When the halogen content drops below about 5 wt. percent, the rate of transfer of the halogen to the aqueous liquid being treated is too small for most practical purposes and the resin should be regenerated or replaced.

Semipermeable membrane

Critical to the process is a semipermeable membrane that is essentially impermeable to water-soluble anions such as chloride, bromide, carbonate, bicarbonate, sulfate, etc., but is permeable to the halogen released by the polyhalide resin. Particularly effective are microporous polyethylene films widely used in packaging which permit diffusion of chlorine and bromine but are chemically resistant to these halogens in the presence of water at normal water treatment temperatures. Other suitable membrane materials include polypropylene, chlorinated polyethylene, and other polyolefins; polyacrylates; polystyrene; and polyvinyl chloride; copolymers of ethylene, propylene, vinyl chloride, vinyl acetate, etc.

Since the diffusion of halogen is inversely proportional to the semipermeable membrane thickness, thin membranes are desirable. Normally a thickness of about 0.1–4.0 mils provides an effective barrier to the transfer of undesirable anions from the aqueous liquid.

To provide sufficient mechanical strength, thin semipermeable membranes can be supported by an appropriate mesh or screen of a halogen resistant material such as a polyamide, a polyester, polyvinylidene chloride, polytetrafluoroethylene, etc. Alternately a composite or laminated material can be used. Thus a high wet strength paper or bleached cotton cloth can be laminated with polyethylene or other halogen permeable film to provide a strong and durable membrane which can be formed into a pouch or other container for the polyhalide resin. Another variation within the scope of this discovery is the use of anion-exchange resin beads coated with an appropriate film or embedded in a semipermeable matrix.

The requisite semipermeability and other membrane properties are readily determined by standard techniques as described for example in S. H. Pinner "Modern Packaging Films," Buttersworths, London (1967). Cf. also "Modern Plastics Encyclopedia," vol. 45, McGraw-Hill Co., New York (1968), pp. 520–567.

Treatment of aqueous liquids

A wide variety of aqueous liquids can be treated with halogen by this improved process. It is particularly applicable to the control of bacteria, algae, slime, and other microorganisms in potable water supply and recirculating cooling water systems.

Since intimate contact of the aqueous liquid and the semipermeable membrane enhances the rate of halogen transfer from the polyhalide resin, the process advantageously uses a packet of resin in the semipermeable film placed in a column so that the aqueous liquid flows over the membrane surface on the opposite side from the resin. A rapid flow of liquid over the membrane surface achieved in a column operation, or by effective agitation with a polyhalide resin packet suspended in a larger body of aqueous fluid increases the effective transfer of halogen.

The concentration of halogen in the treated liquid after contact with the semipermeable membrane can be determined by standard analysis. Normally a halogen concentration of about 0.1–2 p.p.m. will provide effective control of microorganisms. However, higher concentrations may be required at times. Alternately the treated liquid can be diluted with untreated liquid or contacted with charcoal, a virgin anion-exchange resin, or other suitable material to reduce the excess halogen to a desired level. Since the semipermeable membrane eliminates contamination of the polyhalide resin and thus a major source of resin instability and erratic halogen elution rates, the improved process is particularly effective for use with automatic water purifying equipment.

The following examples further illustrate this invention. Unless otherwise stated, all parts and percentages are by weight.

Example 1.—Treatment of water with polybromide resin (A) About 100 ml. of a moist strong base quaternary ammonium anion-exchange resin (Dowex 21K resin, 20–50 mesh) in polybromide form containing 25 wt. percent bromine was sealed in a 1 mil polyethylene film packet and placed on a perforated polytetrafluoroethylene support in a 5 cm. 1D ion-exchange resin column.

Tap water at line temperature was passed through the column at different flowrates and the bromine concentration in the eluent water determined. Typical results are given in Table 1.

TABLE 1

[Release of bromine from polybromide resin (25% $Br_2$) in 1 mil polyethylene packet]

| Flowrate, ml./min | 20 | 100 | 600 |
|---|---|---|---|
| Eluent $Br_2$, p.p.m | 0.94 | 0.09 | 0.04 |

(B) In contrast a similar resin column with 100 ml. of polybromide resin containing 25.1 wt. percent bromine in a water porous cartridge gave eluent bromine concentrations ranging from about 0.6 p.p.m. at 100 ml./min. to about 2.0–2.4 p.p.m. at 590 ml./min. during initial operation. However, higher elution rates were observed during later stages of operation apparently related to the formation of the less stable $Br_2Cl^-$ anion from interaction of the polybromide resin with the chloride present in the tap water.

Example 2

In another experiment, a 1 mil polyethylene packet loaded with a moist polybromide resin containing about 50 wt. percent bromine was placed in the resin column. Typical results from elution with tap water at line temperature and different flowrates are given in Table 2.

TABLE 2

[Release of bromine from polybromide resin (50% $Br_2$) in 1 mil polyethylene packet]

| Flowrate, ml./min | 20 | 50 | 100 | 300 | 500 | 900 | 1,700 |
|---|---|---|---|---|---|---|---|
| Eluent $Br_2$, p.p.m | 158 | 18 | 9 | 5 | 3.5 | 2.0 | 1.0 |

Although for a given flowrate and resin halogen content, the use of a semipermeable membrane reduces the concentration of halogen in the eluent liquid, concentrations effective for water treatment can be obtained without the instabilities arising from the influence of anions and alkalinity in the water supply. By control of the halogen content of the resin and the diffusion characteristics of the semipermeable membrane effective operation can be achieved for a wide variety of applications and needs.

We claim:

1. In a process for treating an aqueous liquid with halogen released from an anion-exchange resin in polyhalide form, the impovement which comprises:
   contacting the aqueous liquid with a semipermeable membrane interposed between (1) the liquid and (2) a water-wet polyhalide resin having a higher equilibrium concentration of halogen or interhalogen than the liquid to be treated, said membrane being permeable to the halogen or interhalogen but essentially impermeable to water-soluble anions in the aqueous liquid, and thereby
   transferring halogen or interhalogen from the polyhalide resin (2) to the aqueous liquid (1).

2. The process of claim 1 where the halogen or interhalogen is bromine or bromine chloride.

3. The process of claim 1 where the polyhalide resin contains more than about 5 weight percent of active halogen.

4. The process of claim 1 where the semipermeable membrane is a polyethylene film.

5. The process of claim 4 where the polyethylene film has a thickness of about 0.1–4.0 mils.

6. A packet suitable for treating an aqueous liquid with halogen released from an anion-exchange resin in polyhalide form comprising: a strong base quaternary ammonium anion-exchange resin in polyhalide form, and a container therefor, said container being chemically resistant to aqueous halogen solutions and comprising at least in part a membrane permeable to halogen or interhalogen released by the polyhalide resin but essentially impermeable to water-soluble anions.

7. The packet of claim 6 where the halogen or interhalogen is bromine or bromine chloride.

8. The packet of claim 6 where the semipermeable membrane is a polyethylene film having a thickness of about 0.1–4.0 mils.

References Cited

UNITED STATES PATENTS

| 3,436,345 | 4/1969 | Goodenough et al. | 210—37X |
| 3,468,796 | 9/1969 | Holl et al. | 210—22 |

FRANK A. SPEAR, Jr., Primary Examiner

U.S. Cl. X.R.

210—37, 62, 282, 321